(12) United States Patent
Liu et al.

(10) Patent No.: US 11,880,341 B2
(45) Date of Patent: Jan. 23, 2024

(54) CONTAINER IMAGE PROCESSING METHOD AND APPARATUS, AND NON-TRANSITORY COMPUTER-READABLE STORAGE MEDIUM

(71) Applicant: BEIJING BAIDU NETCOM SCIENCE AND TECHNOLOGY CO., LTD., Beijing (CN)

(72) Inventors: Chi Liu, Beijing (CN); Ziheng Li, Beijing (CN); Kai Chen, Beijing (CN); Xiaoning Yu, Beijing (CN); Hui Han, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 80 days.

(21) Appl. No.: 16/924,624

(22) Filed: Jul. 9, 2020

(65) Prior Publication Data

US 2021/0011885 A1      Jan. 14, 2021

(30) Foreign Application Priority Data

Jul. 11, 2019   (CN) .......................... 201910626226.5

(51) Int. Cl.
*G06F 16/174*   (2019.01)
*G06F 8/61*   (2018.01)
(Continued)

(52) U.S. Cl.
CPC ............ *G06F 16/1744* (2019.01); *G06F 8/63* (2013.01); *G06F 16/162* (2019.01); *G06F 16/183* (2019.01)

(58) Field of Classification Search
CPC .. G06F 16/1744; G06F 16/162; G06F 16/183; G06F 8/63
See application file for complete search history.

(56) References Cited

U.S. PATENT DOCUMENTS 10,140,304 B1 * 11/2018 Bent ...................... G06F 16/13
10,489,354 B2 * 11/2019 Edwards ............... G06F 3/0604
(Continued)

FOREIGN PATENT DOCUMENTS

| CN | 108256059 A | 7/2018 |
| CN | 109656686 A | 4/2019 |

OTHER PUBLICATIONS

Jason Wilder, Jason Wilder's Blog—Squashing Docker Images, Date: Aug. 19, 2014, URL: http://jasonwilder.com/blog/2014/08/19/squashing-docker-images/ (Year: 2014) (Year: 2014).*
(Continued)

*Primary Examiner* — Sherief Badawi
*Assistant Examiner* — Earl Levi Elias
(74) *Attorney, Agent, or Firm* — Lippes Mathias LLP

(57) ABSTRACT

Embodiments of the present disclosure provide a container image processing method and apparatus, and a storage medium. The method includes: obtaining required file information for generating a container image, and constructing a complete image according to the required file information; determining a specified directory to be deleted in the complete image, and compressing the complete image based on the specified directory to be deleted to obtain a compressed image; obtaining directory content of the specified directory to be deleted, and generating content to be mounted based on the directory content of the specified directory to be deleted; and storing the content to be mounted to a block device file system, and mounting the compressed image to the block device file system.

5 Claims, 3 Drawing Sheets

(51) Int. Cl.
    *G06F 16/16*     (2019.01)
    *G06F 16/182*    (2019.01)

(56) References Cited

U.S. PATENT DOCUMENTS

| | | |
|---|---|---|
| 2014/0181027 A1 | 6/2014 | Whitehead et al. |
| 2017/0264684 A1* | 9/2017 | Spillane .............. H04L 67/1095 |
| 2018/0129491 A1* | 5/2018 | Kadam ................. G06F 16/162 |
| 2018/0150487 A1* | 5/2018 | Olivier ..................... G06F 8/36 |
| 2019/0171431 A1* | 6/2019 | Wei ........................... G06F 8/63 |
| 2019/0273655 A1* | 9/2019 | Jones ................. H04L 41/0886 |

OTHER PUBLICATIONS

Jason Wilder, Jason Wilder's Blog—Squashing Docker Images, Date: Aug. 19, 2014, URL: http://jasonwilder.com/blog/2014/08/19/squashing-docker-images/ (Year: 2014).*

OA for CN application 201910626226.5, dated Nov. 25, 2022 (12 pages).

English translation of OA for CN application 201910626226.5 (23 pages).

Squashing Docker Images, Jason Wilder's Blog, Aug. 19, 2014 (7 pages) jasonwilder.com/blog/2014/08/19/squashing-docker-images.

* cited by examiner

CONTAINER IMAGE PROCESSING METHOD AND APPARATUS, AND NON-TRANSITORY COMPUTER-READABLE STORAGE MEDIUM

CROSS-REFERENCE TO RELATED APPLICATION

The present application is based upon and claims priority to Chinese Patent Application No. 201910626226.5, filed on Jul. 11, 2019, the entirety contents of which are incorporated herein by reference.

TECHNICAL FIELD

The present disclosure relates to a field of computer technology, and more particularly, to a container image processing method and apparatus, and a non-transitory computer-readable storage medium.

BACKGROUND

As the popularization of enterprise digitalization, container technology has drastically changed an infrastructure architecture of the industry, industry applications have evolved towards micro-service architectures, and business management has been optimized through cloud platforms. In order to obtain more efficient cloud services, container technology has been widely supported by the industry since its naissance. Through excellent isolation technology, containers can support different applications by starting different runtimes. However, in practical applications, with the rapid growth of image volume and the increase in the number of different images, image distribution in a container environment has gradually become a key issue for cloud service managers.

In the related art, the distribution processing of large images is mainly implemented in the following two ways. The first method is to split a large image into a plurality of small images with sub-functions by splitting image functions. The user needs to select the corresponding image for each startup, which alleviates a problem of slow distribution speed of large images to a certain extent. The second method is to mount the required function modules in the large image to a network file system by a network file system mounting method, thereby reducing the size of the image.

However, the above two methods have different characteristics, different problems and deficiencies. The first method can reduce the size of a single image through image splitting, but the overall image size is not reduced. When high concurrency occurs during pulling, since the overall image volume has not decreased, the pressure on the network resources is equal, and the problem of image distribution has not been fundamentally solved. Meanwhile, the maintenance and operation costs of the image have also increased, a plurality of images are required to be maintained at the same time, and when an image function update scenario is encountered, the operation and update cost is multiplied compared to the previous cost. The second method is to mount the images to the network file system to reduce the size of the image, but the problem is that when users use the corresponding functions in the image, the access from a local disk becomes the access to a remote network file system. Due to the network transmission delay, the user experience is degraded.

SUMMARY

Embodiments of the present disclosure seek to solve at least one of the problems existing in the related art to at least some extent.

Accordingly, an objective of the present disclosure is to provide a container image processing method.

Another objective of the present disclosure is to provide a container image processing apparatus.

Yet another objective of the present disclosure is to provide a non-transitory computer readable storage medium.

In order to achieve the above objectives, embodiments of the present disclosure provide a container image processing method. The method includes: obtaining required file information for generating a container image, and constructing a complete image according to the required file information; determining a specified directory to be deleted in the complete image, and compressing the complete image based on the specified directory to be deleted to obtain a compressed image; obtaining directory content of the specified directory to be deleted, and generating content to be mounted based on the directory content of the specified directory to be deleted; and storing the content to be mounted to a block device file system, and mounting the compressed image to the block device file system.

In order to achieve the above objectives, embodiments of the present disclosure provide a container image processing apparatus. The apparatus includes: one or more processors; a memory storing instructions executable by the one or more processors; in which the one or more processors are configured to: obtain required file information for generating a container image, and construct a complete image according to the required file information; determine a specified directory to be deleted in the complete image, and compress the complete image based on the specified directory to be deleted to obtain a compressed image; obtain directory content of the specified directory to be deleted, and generate content to be mounted based on the directory content of the specified directory to be deleted; and store the content to be mounted to a block device file system, and mount the compressed image to the block device file system.

In order to achieve the above objectives, embodiments of the present disclosure provide a non-transitory computer-readable storage medium, when the computer program is executed by a processor, a container image processing method is implemented. The method includes: obtaining required file information for generating a container image, and constructing a complete image according to the required file information; determining a specified directory to be deleted in the complete image, and compressing the complete image based on the specified directory to be deleted to obtain a compressed image; obtaining directory content of the specified directory to be deleted, and generating content to be mounted based on the directory content of the specified directory to be deleted; and storing the content to be mounted to a block device file system, and mounting the compressed image to the block device file system.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent

DETAILED DESCRIPTION

Figure 1:
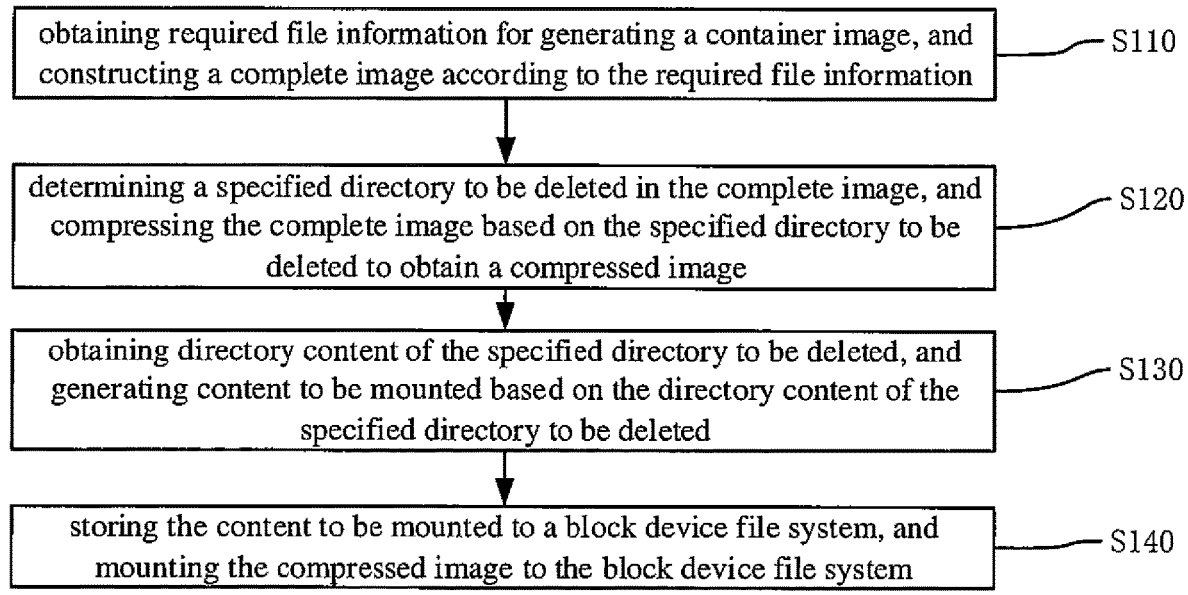
FIG. 1 is a flowchart of a container image processing method according to an embodiment of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

As the popularization of enterprise digitalization, container technology has drastically changed an infrastructure architecture of the industry, industry applications have evolved towards micro-service architectures, and business management has been optimized through cloud platforms. In order to obtain more efficient cloud services, container technology has been widely supported by the industry since its naissance. Through excellent isolation technology, containers can support different applications by starting different runtimes. However, in practical applications, with the rapid growth of image volume and the increase in the number of different images, image distribution in a container environment has gradually become a key issue for cloud service managers. Container technology greatly improves the efficiency of application configuration and deployment, but it often does not perform well when it comes to large-scale distribution of container images using data center storage and network capacity mainly due to the way Docker images are stored and downloaded. Traditionally, each set of images stored in the library must have all the files related to its layers, which means that to update the Docker images on any host device, the complete images are required to be downloaded from the library. Docker provides a cache mechanism for layers (namely, image layers), which can avoid downloading the complete images when updating to a certain extent, but in practice, it is not guaranteed to add new layers each time without updating the original underlayer (namely, underlying layer or lower layer). Once the underlayer is updated, a pull of the complete image is triggered. Docker Registry (which authorizes a client by verifying a holder token and a set of statements embedded in it) applies a one-to-many mechanism for image distribution, that is, after a pull request for a container system deployment task reaches the Docker Registry, the Docker Registry needs to be processed uniformly by distributing the same image to N nodes, and the output flow at this time is ImageSize*N (the volume of the image is multiplied by the number of container systems), ImageSize represents the size of the image volume. It is easy for this mechanism to deal with a small number of containers in small Web applications. However, once the number of container systems grows to hundreds, thousands, or even millions, the volume of the library will continue to increase as the number of container system increases, and the amount of data that needs to be downloaded for each update will increase. Meanwhile, the increase in the volume of a single Docker image cause the download flow of the image to N GB. For the image file needs to be downloaded during the application release process, if there are a large number of machines to be released at the same time, such as 1,000, the calculation is based on a 5 GB image file. Assuming the bandwidth of the image library is 10,000 Mbps, then ideally it takes at least 68 minutes to directly download the image file from the image library, which causes low distribution speed of the container image.

In the related art, the distribution processing of large images is mainly implemented in the following two ways.

The first way is to split a large image into a plurality of small images with sub-functions by splitting image functions. The user needs to select the corresponding image for each startup, which alleviates a problem of slow distribution speed of large images to a certain extent. The second way is to mount the required function modules in the large image to a network file system by a network file system mounting method, thereby reducing the size of the image.

However, the above two methods have different characteristics, which brings different problems and deficiencies. The first method can reduce the size of a single image through image splitting, but the overall image size is not reduced. When pulling operation occurs with high concurrency, since the overall image volume has not decreased, the pressure on the network resources is not changed, and the problem of image distribution has not been fundamentally solved. Meanwhile, the maintenance and operation costs of the image have also increased, a plurality of images are required to be maintained at the same time, and when an image function update scenario is encountered, the operation and update cost is multiplied compared to the previous cost. The second method is to mount the images to the network file system to reduce the size of the image, but the problem is that when users use the corresponding functions in the image, the access from a local disk becomes the access to a remote network file system. Due to the network transmission delay, the user experience is degraded.

In order to solve the above technical problems in the related art, the present disclosure provides a container image processing method and apparatus, a computer device and a storage medium. The present disclosure addresses the problems related to the low distribution speed caused by large container image volume and excessive delays of container image function of the network file system mounting method. In detail, a container image processing method and apparatus, a computer device, and a computer-readable storage medium according to embodiments of the present disclosure are described below with reference to the accompanying drawings.

FIG. 1 is a flowchart of a container image processing method according to an embodiment of the present disclosure. It should be noted that the container image processing method of the embodiment of the present disclosure can be applied to the container image processing apparatus of the embodiment of the present disclosure, and the apparatus can be configured on a computer device.

As illustrated in FIG. 1, the container image processing method includes the following steps.

At step S110, required file information for generating a container image can be obtained, and a complete image can be constructed according to the required file information.

For example, when generating an image file of an application, required file information for generating the application can be obtained, and a corresponding complete image can be constructed according to the required file information. The file information includes but is not limited to information on software packages.

In order to facilitate subsequent and convenient acquisition of the content to be mounted, optionally, in an embodiment of the present disclosure, when a complete image is constructed, the required file information may be analyzed and file information with a space occupation greater than a preset threshold is determined, and the file information with the space occupation greater than the preset threshold is installed in a specified parent directory in the complete image.

For example, when constructing a complete image, information included in the image, such as software packages, is required to be analyzed, and then the software package with a space occupation greater than a preset threshold is determined, and the software package with the space occupation greater than the preset threshold is installed in a specified parent directory in the complete image.

At step S120, a specified directory to be deleted in the complete image is determined, and the complete image is compressed based on the specified directory to be deleted to obtain a compressed image.

In the embodiment, the specified parent directory is determined as the specified directory to be deleted in the complete image, that is, the parent directory including the file information with a great space occupation in the complete image is determined as the specified directory to be deleted of the complete image, and then the complete image can be compressed based on the specified directory to be deleted to obtain the compressed image.

Optionally, the specific implementation process of compressing the complete image based on the specified directory to be deleted to obtain a compressed image may be as follows. A new layer is added based on the complete image, and the specified directory to be deleted is deleted from the complete image through the new layer to obtain a new image, and then the new image is compressed and merged by applying a compression mechanism of Docker to make layers in the new image being merged into one layer to obtain the compressed image.

In the embodiment of the present disclosure, the compression mechanism used by the Docker may be Squash compression mechanism of Docker.

In other words, based on the constructed complete image, a new image layer is added. The operation of adding the new layer can be used to delete and empty the parent directory of the package installation location selected during the construction of the complete image. The new layer may be understood as that the specified directory to be deleted in the complete image is replaced with a new layer to obtain a new image, and then Squash is performed to compression and merge the obtained new image by using the Docker Squash compression mechanism, and the complete image and the new image are merged into one layer to obtain the compressed image. Since the contents of the directory with a large occupation space in the image are all deleted to serve as the content to be mounted, the size of the compressed image can usually be hundreds of MB.

At step S130, directory content of the specified directory to be deleted is obtained, and content to be mounted is generated based on the directory content of the specified directory to be deleted.

For example, when constructing a complete image, the specified directory to be deleted in the complete image is determined, and the directory content of the specified directory to be deleted is obtained, and then the content of the specified directory to be deleted is determined as the content to be mounted.

At step S140, the content to be mounted is stored to a block device file system, and the compressed image is stored to the block device file system.

In the embodiment of the present disclosure, a block device may be understood as a block storage device, and the block storage device may be regarded as a local disk. In this step, the content to be mounted may be stored in the block device file system, mount points are added to the compressed image, and the compressed image is mounted through the mount points to the block device file system for automatic mounting when the image is activated.

It can be seen that the embodiment of the present disclosure mounts the specified directory in the image to a block storage device, the image is compressed through the Docker Squash mechanism, and the image volume is compressed to a level of hundreds of MB. When image distribution is performed, under the same network resources, more images can be rapidly pulled, which solves the problem of rapid image distribution. In addition, the volume of the image is compressed by mounting. Traditionally, a network file system device is applied to mount the image file, and the embodiment of the present disclosure uses the block device storage system as the mounting solution, which solves the problem of the network delay for mounting the network file system. The block storage device can be regarded as a local disk, and access to the content does not need to go through the network, so it can effectively solve the problem of the slow speed of the internal call function of the image.

In conclusion, according to the container image processing method of the embodiment of the present disclosure, required file information for generating a container image can be obtained, and a complete image can be constructed according to the required file information, and then a specified directory to be deleted in the complete image is determined, and the complete image is compressed based on the specified directory to be deleted to obtain a compressed image. Directory content of the specified directory to be deleted is obtained, and content to be mounted is generated based on the directory content of the specified directory to be deleted, and then the content to be mounted is stored to a block device file system, and the compressed image is stored to the block device file system. This method deletes the specified directory in the constructed complete image to achieve the compressed image, and stores the directory content of the deleted specified directory as the content to be mounted on the block device file system, the compressed image is mounted to the block device file system. This method reduces the size of an image file to be distributed, and accelerates the distribution speed of the container image, and accessing the block device file system does not need to go through the network, which improves the speed of internally calling the container image.

Figure 2:
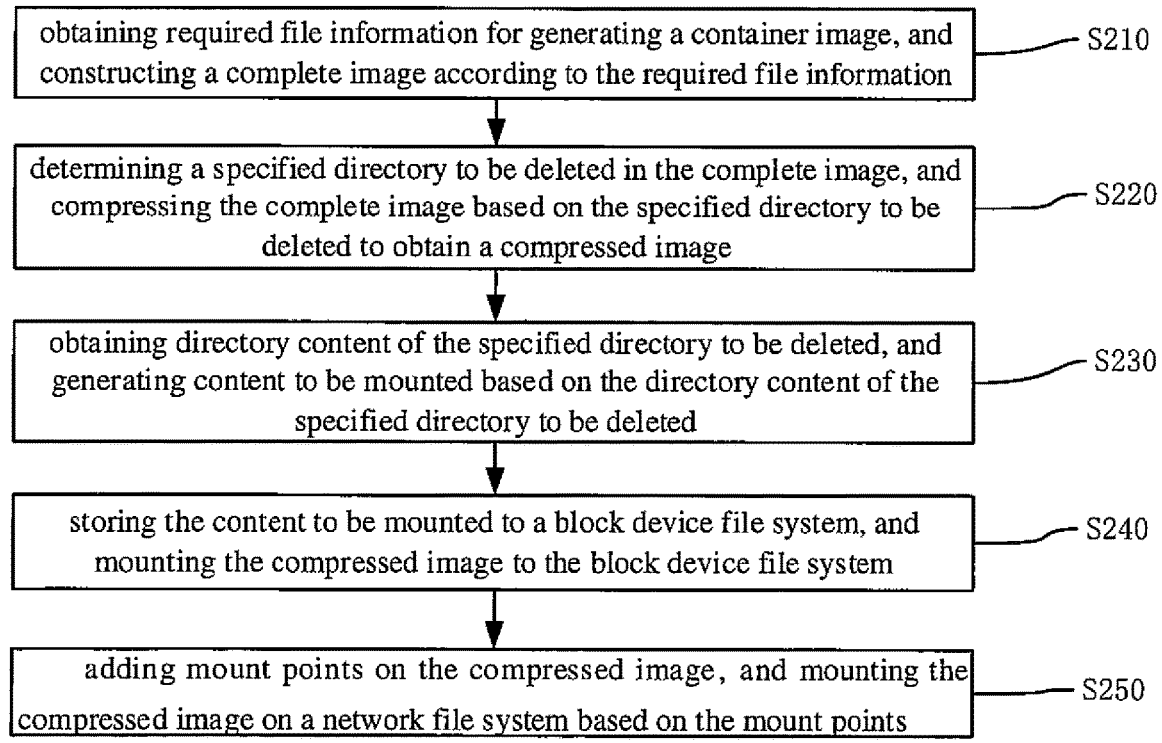
FIG. 2 is a flowchart of a container image processing method according to another embodiment of the present disclosure.

FIG. 2 is a flowchart of a container image processing method according to an embodiment of the present disclosure.

Figure 3:
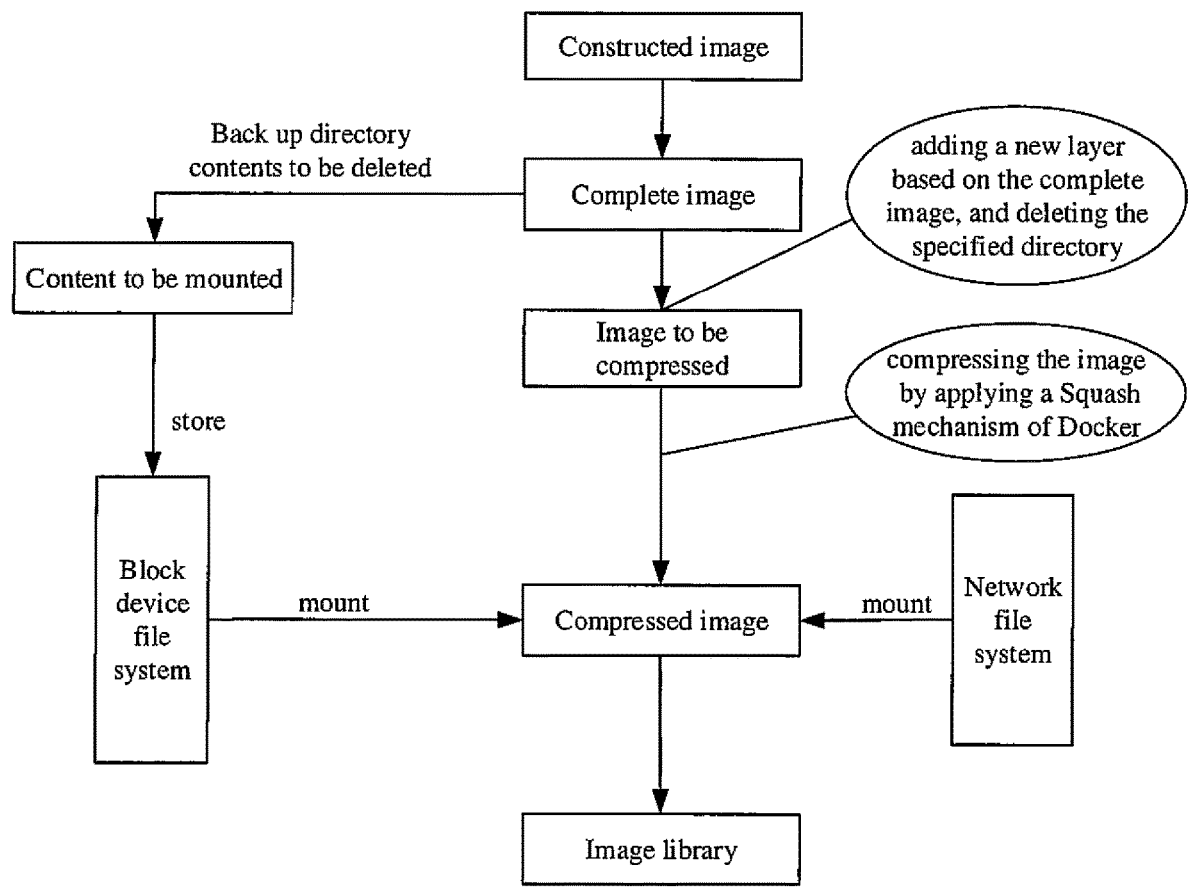
FIG. 3 is a flowchart of a container image processing method according to yet another embodiment of the present disclosure.

In order to solve the problem of repeatedly constructing images when images are functionally updated in small batches, in the embodiment of the present disclosure, by using a mixed mounting method, when mounting a specified directory of the image on the block storage device, a mount point is added, such that it can be mounted on the network file system, and by using this as an entrance, partial functions of the image can be updating by updating the network file system. In detail, as illustrated in FIGS. 2 and 3, the container image processing method may include the following steps.

At step S210, required file information for generating a container image can be obtained, and a complete image can be constructed according to the required file information.

At step S220, a specified directory to be deleted in the complete image is determined, and the complete image is compressed based on the specified directory to be deleted to obtain a compressed image.

At step S230, directory content of the specified directory to be deleted is obtained, and content to be mounted is generated based on the directory content of the specified directory to be deleted.

At step S240, the content to be mounted is stored to a block device file system, and the compressed image is stored to the block device file system.

It should be noted that, in the embodiment of the present disclosure, the specific implementation process of the foregoing steps S210 to S240 refers to the description of the implementation process of the foregoing steps S110 to S140, which is not described in detail herein.

At step S250, mount points are added on the compressed image, and the compressed image is mounted on a network file system based on the mount points.

In the embodiment of the disclosure, an update file for the container image is deployed in the network file system.

In other words, after mounting the compressed image to the block device file system, a mount point may be added on the compressed image, and the compressed image is mounted on a network file system based on the mount point, the update file for the container image is deployed in the network file system. In this way, by using the mount points as an entrance, updating partial functions of the image can be realized by updating the network file system. In the case of small batch function updates, only the update files are required to be deployed to the corresponding network file system, and the latest files can be synchronized in the image, thereby reducing the operation and construction cost brought by the image update.

According to the container image processing method according to the embodiment of the present disclosure, a large-volume directory in an image can be mounted on a block storage device based on a mixed mounting method which combines a block storage device with a network file system. The speed of image distribution is accelerated by compressing the volume of the image using the Docker Squash mechanism. The network file system is mounted to provide an update entry for the image, which reduces the operation and maintenance costs of repeated construction of image update, and realizes rapid distribution of the image.

Corresponding to the container image processing method provided by the foregoing embodiments, the embodiment of the present disclosure also provides a container image processing apparatus. The container image processing method is corresponding to the container image processing apparatus provided in this embodiment, and the container image processing method is also applicable to the container image processing apparatus provided in this embodiment, which will not be described in detail in this embodiment.

Figure 4:
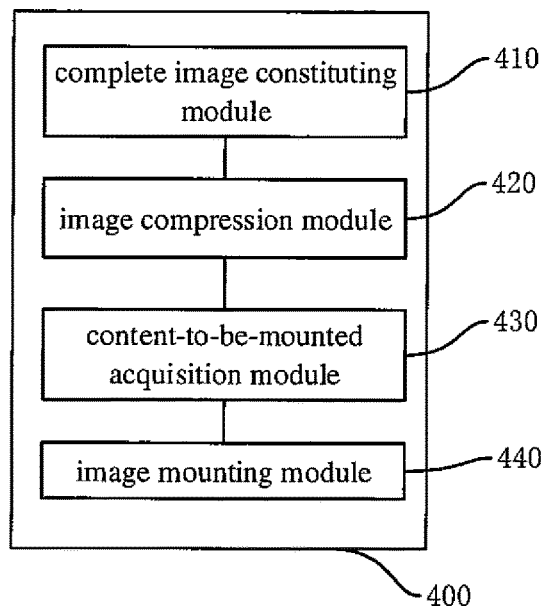
FIG. 4 is a schematic diagram of a container image processing apparatus according to an embodiment of the present disclosure.

FIG. 4 is a schematic diagram of a container image processing apparatus according to an embodiment of the present disclosure. FIG. 4 is a schematic diagram of a container image processing apparatus according to an embodiment of the present disclosure.

As illustrated in FIG. 4, the container image processing apparatus 400 includes: a complete image constituting module 410, an image compression module 420, a content-to-be-mounted acquisition module 430, and an image mounting module 440.

The complete image constituting module 410 is configured to obtain required file information for generating a container image, and construct a complete image according to the required file information. Moreover, when constructing the complete image, the complete image constituting module 410 is configured to analyze the required file information to determine file information with a space occupation greater than a preset threshold, and install the file information with the space occupation greater than the preset threshold in a specified parent directory in the complete image.

The image compression module 420 is configured to determine a specified directory to be deleted in the complete image, and compress the complete image based on the specified directory to be deleted to obtain a compressed image. The image compression module 420 is further configured to determine the specified parent directory as the specified directory to be deleted in the complete image.

In an embodiment of the present disclosure, the image compression module 420 is further configured to add a new layer based on the complete image, and deleting the specified directory to be deleted from the complete image through the new layer to obtain a new image, and compress and merge the new image by applying a compression mechanism of Docker to make layers in the new image being merged into one layer to obtain the compressed image.

The content-to-be-mounted acquisition module 430 is configured to obtain directory content of the specified directory to be deleted, and generate content to be mounted based on the directory content of the specified directory to be deleted.

The image mounting module 440 is configured to store the content to be mounted to a block device file system, and mount the compressed image to the block device file system. For example, when the compressed image is mounted to the block device file system, the image mounting module 440 is further configured to add mount points on the compressed image, and mount the compressed image on a network file system based on the mount points. An update file for the container image is deployed in the network file system.

According to the container image processing apparatus of the embodiment of the present disclosure, required file information for generating a container image can be obtained, and a complete image can be constructed according to the required file information, and then a specified directory to be deleted in the complete image is determined, and the complete image is compressed based on the specified directory to be deleted to obtain a compressed image. Directory content of the specified directory to be deleted is obtained, and content to be mounted is generated based on the directory content of the specified directory to be deleted, and then the content to be mounted is stored to a block device file system, and the compressed image is mounted to the block device file system. This method deletes the specified directory in the constructed complete image to achieve the compressed image, and stores the directory content of the deleted specified directory as the content to be mounted on the block device file system, the compressed image is mounted to the block device file system. This method reduces the size of an image file to be distributed, and accelerates the distribution speed of the container image, and accessing the block device file system does not need to go through the network, which improves the speed of internally calling the container image.

In order to realize the above embodiments, the disclosure further provides a computer device.

Figure 5:
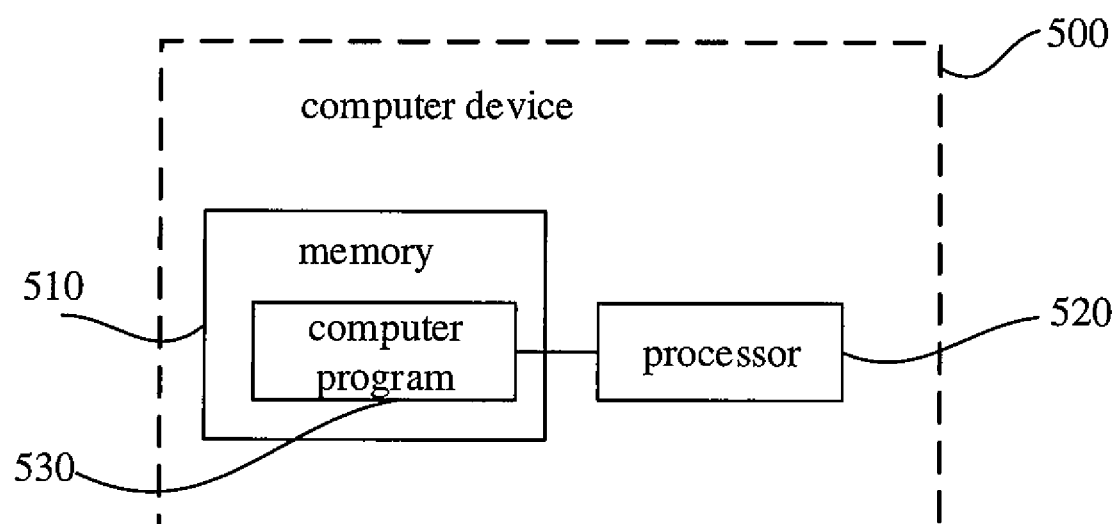
FIG. 5 is a schematic diagram of a computer device according to an embodiment of the present disclosure.

FIG. 5 is a schematic diagram of a computer device according to an embodiment of the present disclosure. As illustrated in FIG. 5, the computer device 500 includes: a memory 510, a processor 520, and a computer program 530 stored on the memory 510 and executable on the processor 520, when the program is executed by the processor 520, the container image processing method according to any one of claims is implemented.

In order to realize the above embodiments, the disclosure further provides a computer program. When the program is executed by a processor, the container image processing method according to any one of claims is implemented.

It should be understood that the wording "image" used in the present disclosure also refers to "mirror", "mirroring" or "image mirroring" in the related art.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A container image processing method, comprising:
obtaining required file information for generating a container image, and constructing a complete image according to the required file information;
analyzing the required file information to determine file information with a space occupation greater than a preset threshold;
installing the file information with the space occupation greater than the preset threshold in a specified parent directory of the complete image;
determining the specified parent directory as a specified directory to be deleted of the complete image;
adding a new layer based on the complete image, and replacing the specified directory to be deleted of the complete image with the new layer to obtain a new image;

compressing and merging the new image by applying a Docker Squash compression mechanism to make layers in the new image being merged into one layer to obtain the compressed image;

obtaining directory content of the specified directory to be deleted, and generating content to be mounted based on the directory content of the specified directory to be deleted; and storing the content to be mounted to a block device file system, adding first mount points on the compressed image, and mounting the compressed image to the block device file system through the first mount points, for automatic mounting when an image is activated, wherein the block device file system is a local disk.

2. The method according to claim 1, wherein when the compressed image is mounted to the block device file system, the method further comprises:

adding second mount points on the compressed image; and mounting the compressed image on a network file system based on the second mount points, wherein an update file for the container image is deployed in the network file system.

3. A container image distribution apparatus, comprising:
one or more processors;
a memory storing instructions executable by the one or more processors;
wherein the one or more processors are configured to:
obtain required file information for generating a container image, and construct a complete image according to the required file information;
analyze the required file information to determine file information with a space occupation greater than a preset threshold;
install the file information with the space occupation greater than the preset threshold in a specified parent directory of the complete image;
determine the specified parent directory as a specified directory to be deleted of the complete image;
add a new layer based on the complete image, and replacing the specified directory to be deleted of the complete image with the new layer to obtain a new image;
compress and merge the new image by applying a Docker Squash compression mechanism to make layers in the new image being merged into one layer to obtain the compressed image;
obtain directory content of the specified directory to be deleted, and generate content to be mounted based on the directory content of the specified directory to be deleted; and store the content to be mounted to a block device file system, add first mount points on the compressed image, and mount the compressed image to the block device file system through the first mount points, for automatic mounting when an image is activated, wherein the block device file system is a local disk.

4. The apparatus according to claim 3, wherein when the compressed image is mounted to the block device file system, the one or more processors are further configured to: add second mount points on the compressed image, and mount the compressed image on a network file system based on the second mount points, and an update file for the container image is deployed in the network file system.

5. A non-transitory computer-readable storage medium having a computer program stored thereon, wherein when the program is executed by a processor, a container image processing method is implemented, and the method comprises:

obtaining required file information for generating a container image, and constructing a complete image according to the required file information;

analyzing the required file information to determine file information with a space occupation greater than a preset threshold;

installing the file information with the space occupation greater than the preset threshold in a specified parent directory of the complete image;

determining the specified parent directory as a specified directory to be deleted of the complete image;

adding a new layer based on the complete image, and replacing the specified directory to be deleted of the complete image with the new layer to obtain a new image;

compressing and merging the new image by applying a Docker Squash compression mechanism to make layers in the new image being merged into one layer to obtain the compressed image;

obtaining directory content of the specified directory to be deleted, and generating content to be mounted based on the directory content of the specified directory to be deleted; and storing the content to be mounted to a block device file system, adding first mount points on the compressed image, and mounting the compressed image to the block device file system through the first mount points, for automatic mounting when an image is activated, wherein the block device file system is a local disk.

* * * * *